Figure 1:
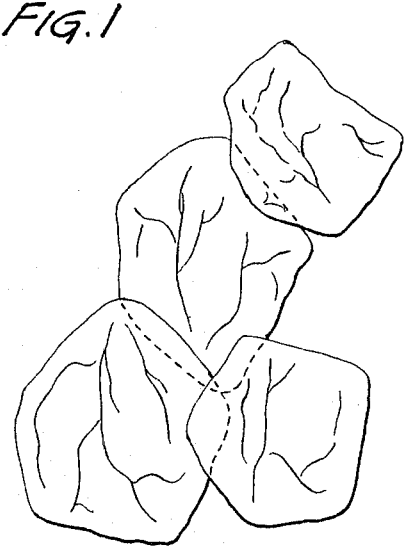

Sept. 6, 1966   H. E. AVERETTE, JR   3,271,257
CYTODIAGNOSIS OF RUPTURED FETAL MEMBRANES
Filed Oct. 10, 1963

INVENTOR
HERVY E. AVERETTE, JR.
BY
Williamson & Palmatier
ATTORNEYS 3,271,257
CYTODIAGNOSIS OF RUPTURED FETAL
MEMBRANES
Hervy E. Averette, Jr., 4010 SW. 10th St.,
Miami, Fla.
Filed Oct. 10, 1963, Ser. No. 315,224
7 Claims. (Cl. 167—84.5)

This invention relates to a novel method and means for diagnosing ruptured fetal membranes.

The management of a pregnant patient depends in part upon whether or not the fetal membranes are intact or ruptured. Oftentimes, the diagnosis of rupture of the fetal membrane can be properly made from the patient's history and a physical examination. However, in many instances, it is unreliable and/or the examination is inconclusive. Numerous tests have been devised in the past to detect ruptured fetal membranes but they have not proved as satisfactory as desired, either because they are unreliable, too time consuming, or difficult to conduct or analyze. Some of these prior tests include: (a) detection of a shift in pH of vaginal fluids after rupture of the membranes; (b) identification of fetal products such as fat droplets or lanugo hairs in vaginal smears; (c) the amniotic fluid crystallization test.

An object of this invention is to provide a novel test for quickly and accurately determining whether or not fetal membranes have been ruptured, which is faster, more reliable, and simpler to conduct than prior tests.

Another object of this invention is to provide a novel cytologic test for identifying the presence of fetal squamas or vernix caseosa cells in vaginal smears as a means of detecting ruptured fetal membranes.

Still another object is to provide a novel test for detecting ruptured fetal membranes which involves identification of vernix caseosa cells in a vaginal smear by staining of said smear with a dye capable of identifying and distinguishing vernix caseosa cells when the stained smear is viewed under a microscope.

A still further object is to provide a stain for carrying out the aforedescribed method of this invention which is capable of almost instantly staining the vaginal smears and identifying the vernix caseosa cells.

Figure 2:
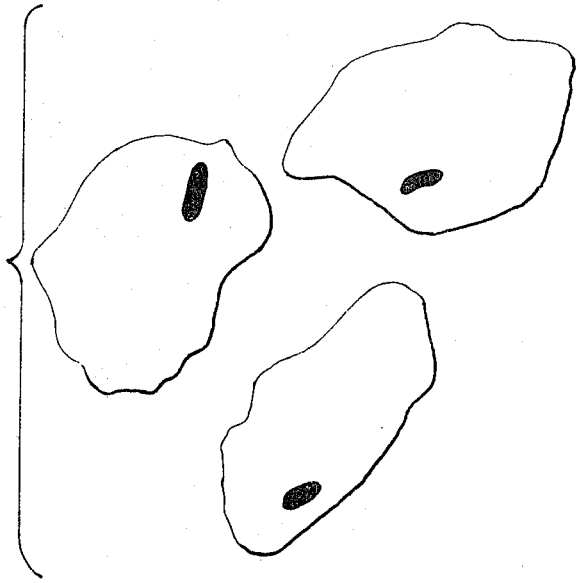

These and other objects and advantages of this invention will more fully appear from the following description made in connection with the accompanying drawings wherein like reference characters refer to the same or similar parts throughout the several views, and in which:

FIG. 1 is a highly magnified diagrammatic illustration of vernix caseosa cells as they appear in a stained vaginal smear; and FIG. 2 is a highly magnified diagrammatic illustration of vaginal epithelial cells as they appear in a stained vaginal smear.

The method of this invention comprises obtaining a vaginal smear from the pregnant patient, then staining the smear with a die or stain which enables vernix caseosa cells to be readily identified under a microscope if they are present in the smear. The dye or stain is preferably one which will react immediately and which will clearly identify the vernix caseosa cells if they are present so that the tests can be conducted as quickly and effectively as possible. If vernix cells are observed in the vaginal smear, this is positive evidence that there is a rent in the amnion and that the fetal membrane is ruptured.

I have discovered that the cyanine dyes, particularly those derived from quinoline, more particularly the carbocyanines, still more particularly the 2,2'-carbocyanines, and specifically the pinacyanols are especially effective as the staining agent in the test of this invention.

The cyanine dyes consist of two nitrogen-containing ring systems in one of which the nitrogen atom is trivalent and in the other it is tetra-covalent; the two nitrogen atoms being linked by a conjugated chain of an uneven number of carbon atoms. The carbocyanines are those cyanine dyes in which the ring systems are united by a =CH—CH=CH— group. The 2,2'-carbocyanines are those in which the ring systems are united by said group in the 2,2' positions. The pinacyanols are 2,2'-carbocyanines derived from quinoline, the strutcural formula of which is

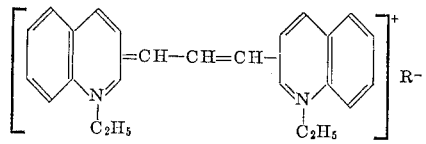

wherein the radical R represents any suitable anion. Two of the pinacyanols which are particularly effective in the test of this invention are pinacyanol iodide and pinacyanole chloride. Pinacyanol iodide (1,1-diethyl-2,2-carbocyanine iodide) has the aforementioned structural formula in which R is an atom of iodine. Pinacyanol chloride (1,1-diethyl-2,2-carbocyanine chloride) has the aforementioned structural formula in which R is an atom of chlorine. These dyes are metachromatic and sensitize throughout the red region. Pinacyanol chloride is preferable to pinacyanol iodide for purposes of this invention because it is the more soluble of the two.

Pinacyanol iodide and pinacyanol chloride, when applied to a vaginal smear almost instantly stain same and clearly differentiate the vernix caseosa cells if they are present and enable them to be readily identified under a microscope. The entire staining procedure with these dyes requires only about twenty seconds and the smear can be examined for vernix cells immediately.

FIG. 1 illustrates how vernix caesosa cells appear in a stained vaginal smear when viewed under a microscope. The vernix cells are anucleated, polygonal, transparent squamous cells which have a delicate canal system which is readily identified under high magnification. In vaginal smears, the vernix cells are not covered by extraneous material, and frequently occur in sheets near the periphery of the vaginal smear. When stained with pinacyanol chloride, the vernix cells stain pale blue or pale lavender, or take no stain at all.

The vernix cells are readily distinguishable from the vaginal epithelial cells, the latter being illustrated in FIG. 2. The vaginal cells are nucleated round or oval cells which are stained dark blue or purple by pinacyanole chloride. The cytoplasm of the vaginal cells is dense and seldom has a canal system and if such a canal system is present, it is coarse and difficult to outline. The vaginal cells are more opaque than the vernix cells and are likely to be covered with extraneous material such as bacteria, cell rests and debris. They are also rarely found in groups or sheets and are scattered throughout the smear. Also, tiny halos or nuclear ghosts appear in hypercornified anucleated vaginal cells, which halos are absent in vernix cells.

The smear material may be stained directly after its removal from the vagina, or the staining may be preceded by treatment of the smear material with a suitable cell fixing agent such as 95% ethyl or methylalcohol for a time sufficient to properly fix the cells, which time is usually considered to be at least one minute.

If the smears are not fixed, the best staining results are obtained by using the more concentrated alcohol solutions (approximately 50–95% alcohol) with the higher alcohol concentrations in this range being the most preferred. If fixation precedes the staining, then satisfactory staining results can usually be obtained with solutions of any alcohol concentration whether high or low capable of properly dissolving the dye, the lower alcohol concentrations (approximately 25–50% alcohol) usually being preferred for staining fixed smears.

Inclusion of the fixation step has several important advantages. One is that it fixes the cells, and thereby permits a substantial delay between the obtaining of the smear and the actual staining thereof, whereby the smears can be stained and examined whenever it is convenient to do so. Without fixation, the smears should be stained almost immediately after obtaining same, before drying of the smear or deterioration of the cells present therein takes place.

Another advantage is that the staining time is less critical if the cells are fixed, thereby permitting better control of the staining to obtain the best results.

To prevent overstaining, the excess stain is washed away, such as with tap water, after the smear has been exposed to the stain for the proper length of time. When fixed cells are stained with a solution of pinacyanol chloride in methanol, the proper exposure time is usually in the approximate range of 20–40 seconds.

Methanol and ethanol are preferred solvents for the pinacyanole dyes used in this test. However, the invention is not limited thereto and other suitable solvents capable of producing the desired results may be used.

One preferred complete test for ruptured fetal membranes according to this invention is conducted as follows: A speculum is inserted in the vagina to inspect the cervix for escaping amniotic fluid. If this fluid is seen, further testing is not required. If this examination is inconclusive, the speculum is removed and a specimen of vaginal material is obtained, preferably manually by sterile gloved fingers inserted into the cervical canal and the posterior fornix. It is important to remove any powder from the glove before obtaining the specimen from the vagina and cervix and this powder removal can be easily accomplished by pouring an antiseptic solution over the gloved hand just prior to the vaginal examination. A spatula may be used for obtaining the vaginal specimen, but the use of the gloved finger is preferred. Immediately after the examining hand is removed from the vagina, the vaginal material on the fingers is smeared on clean glass slides. The smeared material is then covered immediately with 95% ethyl alcohol to fix the cells. The smears are kept in the alcohol until the stain is to be applied thereto, and should remain in the alcohol at least one minute for proper fixation. At a time when it is convenient for those conducting the test to examine the smears under a microscope, the smears are removed from the fixing alcohol and covered with a .25% solution of pinacyanole chloride in 50% methyl alcohol for 20–40 seconds. After proper exposure, the excess stain is washed away with tap water and the slides are examined under a microscope for the presence of vernix caseosa cells. If vernix cells are seen, this is positive incontravertible evidence that the amnion or fetal membranes are ruptured. If no vernix cells are seen, the membranes are intact.

As an alternative procedure, the smears may be stained immediately after obtaining same, without drying or fixation thereof, with a more concentrated alcohol solution, preferably 95%.

Solutions containing approximately 0.25–0.50% pinacynaol chloride or pinacyanol iodide are preferred for carrying out the test of this invention. However, the invention is not necessarily limited thereto, satisfactory results being obtainable with other concentrations.

It will, of course, be understood that various changes may be made in the form, details, arrangement and proportions of the various parts without departing from the scope of my invention.

What I claim is:
1. A method of testing for ruptured fetal membranes comprising staining a vaginal smear with a dye capable of enabling vernix caseosa cells to be readily indentified under a microscope if they are present in said smear, said vaginal smear having been obtained from a pregnant patient, said dye being selected from the group comprising pinacyanol chloride and pinacyanol iodide.

2. The method of claim 1, wherein said dye is pinacyanol chloride.

3. The method of claim 1, wherein said dye is pinacyanol iodide.

4. A method of testing for ruptured fetal membranes comprising forming a vaginal smear on a clean glass slide, said vaginal smear having been obtained from a pregnant patient, immersing said smear in ethyl alcohol for at least one minute, removing said smear from said alcohol and staining said smear with an approximately 0.25%–0.50% solution of pinacyanol chloride in methyl alcohol for approximately 20–40 seconds, washing said smear with water to remove excess stain, and examining said smear under a microscope to determine if vernix caseosa cells are present in said smear.

5. A method of testing for ruptured fetal membranes comprising forming a vaginal smear on a slide, said vaginal smear having been obtained from a pregnant patient, fixing said smear, staining the fixed smear with pinacyanol chloride and examining said smear under a microscope to determine if vernix caseosa cells are present in said smear.

6. A method of testing for ruptured fetal membranes comprising forming a vaginal smear on a slide, said vaginal smear having been obtained from a pregnant patient, fixing said smear, staining the fixed smear with pinacyanol iodide, and examining said smear under a microscope to determine if vernix caseosa cells are present in said smear.

7. A method of testing for ruptured fetal membranes comprising fixing a vaginal smear, said vaginal smear having been obtained from a pregnant patient, staining the fixed smear with a dye which identifies vernix caseosa cells if they are present in said smear, said dye being selected from the group comprising pinacyanol chloride and pinacyanol iodide, terminating the staining by washing excess dye from said smear, and examining the washed smear under a microscope to determine if vernix caseosa cells are present in said smear.

References Cited by the Examiner

Chem. Abst. Fifth Decennial Index, 1947–1956, p. 9756S.

JULIAN S. LEVITT, *Primary Examiner.*

SAM ROSEN, *Examiner.*